United States Patent [19]

Ebadat et al.

[11] Patent Number: 5,679,449
[45] Date of Patent: Oct. 21, 1997

[54] LOW DISCHARGE ANTI-INCENDIARY FLEXIBLE INTERMEDIATE BULK CONTAINER

[75] Inventors: Vahid Ebadat, Lawrenceville, N.J.; George M. Milner, Summerville; Robert J. Pappas, Mt. Pleasant, both of S.C.

[73] Assignee: Linq Industrial Fabrics, Inc., Summerville, S.C.

[21] Appl. No.: 457,441

[22] Filed: Jun. 1, 1995

[51] Int. Cl.$^6$ .................................................. D04H 1/58
[52] U.S. Cl. ........................ 428/288; 428/373; 428/374; 428/368; 428/397; 383/67; 383/105; 383/113; 383/116; 383/117
[58] Field of Search ........................... 428/288, 373, 428/374, 368, 397; 383/67, 105, 113, 116, 117

[56] References Cited

U.S. PATENT DOCUMENTS

| | | |
|---|---|---|
| 3,470,928 | 10/1969 | Schwartz . |
| 3,678,675 | 7/1972 | Klein . |
| 4,207,376 | 6/1980 | Nagayasu et al. . |
| 4,207,937 | 6/1980 | Sandeman et al. . |
| 4,362,199 | 12/1982 | Futerman . |
| 4,431,316 | 2/1984 | Massey . |
| 4,643,119 | 2/1987 | Langston et al. . |
| 4,833,008 | 5/1989 | Derby . |
| 4,900,495 | 2/1990 | Lin . |
| 4,921,751 | 5/1990 | Wakahara et al. . |
| 4,989,995 | 2/1991 | Rubenstein et al. . |
| 4,997,712 | 3/1991 | Lin . |
| 5,071,699 | 12/1991 | Pappas et al. . |
| 5,092,683 | 3/1992 | Wurr . |
| 5,202,185 | 4/1993 | Samuelson . |
| 5,213,865 | 5/1993 | Yamada . |
| 5,244,281 | 9/1993 | Williamson et al. . |
| 5,260,013 | 11/1993 | Samuelson . |

FOREIGN PATENT DOCUMENTS

| | | |
|---|---|---|
| 637129 | 8/1990 | Australia . |
| 1143673 | 3/1983 | Canada . |
| 2023643 | 2/1991 | Canada . |

OTHER PUBLICATIONS

A study of the incendivity of electrical discharges between planar resistive electrodes, G.J. Butterworth, E. S. Paul and J. N. Chubb, Culham Laboratory, Abingdon, Oxon UK.

Anti-Static Mechanisms Associated with FIBCs Containing Conductive Threads, S. Beattie, Process Safety conference, London, UK, Nov. 16–17, 1994.

The Assessment of the Safety of Underground Antistatic Flexible Intermediate Bulk Containers, Paul Holdstock, Process Safety Conference London, UK, Nov. 16–17, 1994.

Primary Examiner—Helen Lee
Attorney, Agent, or Firm—Dickstein Shapiro Morin & Oshinsky LLP

[57] ABSTRACT

A system with reduced electrostatic discharge including woven fabric configured into a flexible container and having sufficient electrical resistivity to allow discharges of energy from the fabric of below about one-hundred nanocoulombs when the fabric is charged to more than about negative ten thousand volts. The flexible fabric container with a reduced potential for incendiary discharge may further include quasi-conductive fibers or a combination of quasi-conductive fibers and an antistatic coating. The quasi-conductive fibers further may be woven into the fabric. The present invention also discloses a method for reducing electrostatic discharge in ungrounded type flexible fabric container systems by providing a flexible fabric container made from woven fabric and adjusting the electric resistivity of the woven fabric to allow the flow of electricity through the fabric at a rate allowing discharges at below about one-hundred nanocoulombs when the fabric is charged at more than about negative ten kilovolts.

10 Claims, 9 Drawing Sheets

LOW DISCHARGE ANTI-INCENDIARY FLEXIBLE INTERMEDIATE BULK CONTAINER

BACKGROUND

The present invention is related to antistatic fabrics. More particularly the present invention relates to a system and method for decreasing electrostatic discharges to reduce the potential for incendiary discharges caused by electrostatic charges in flexible containers such as flexible intermediate bulk containers (FIBCs).

Containers formed of flexible fabric are being used in commerce more and more widely to carry free-flowable materials in bulk quantities. Flexible intermediate bulk containers have been utilized for a number of years to transport and deliver finely divided solids such as cement, fertilizers, salt, sugar, and barite, among others. Such bulk containers can in fact be utilized for transporting almost any type of free-flowable finely divided solid. The fabric from which they are generally constructed is a weave of a polyolefin, e.g., polypropylene, which may optionally receive a coating of a similar polyolefin on one or both sides of the fabric. If such a coating is applied, the fabric will be non-porous, while fabric without such coating will be porous. The usual configuration of such flexible bulk containers involves a rectilinear or cylindrical body having a wall, base, cover, and a closable spout secured to extend from the base or the top or both.

Such containers are handled by placing the forks of a forklift hoist through loops attached to the container. The weight of such a bulk container when loaded is typically between 500 pounds and 4,000 pounds, depending upon the density of the material being transported.

Crystalline (isotactic) polypropylene is a particularly useful material from which to fabricate monofilament, multifilament or flat tape yarns for use in the construction of such woven fabrics. In weaving fabrics of polypropylene, it is the practice to orient the yarns monoaxially, which may be of rectangular or circular cross-section. This is usually accomplished by hot-drawing, so as to irreversible stretch the yarns and thereby orient their molecular structure. Fabrics of this construction are exceptionally strong and stable as well as being light-weight.

Examples of textile fabrics of the type described above and flexible bulk containers made using such fabrics are disclosed in U.S. Pat. Nos. 3,470,928, 4,207,937, 4,362,199, and 4,643,119.

It has been found that the shifting of specific materials within containers made of woven fabrics, as well as particle separation between the materials and such containers during loading and unloading of the container cause triboelectrification and create an accumulation of static electricity on the container walls. In addition, the accumulation of static electricity is greater at lower relative humidity and increases as the relative humidity drops. Also, highly charged material entering such containers can create an accumulation of static electricity on the container walls. Electrostatic discharges from a charged container can be incendiary, i.e., cause combustion in dusty atmospheres or in flammable vapor atmospheres. Moreover, discharges can be quite uncomfortable to workers handling such containers.

One conventional approach to solving this problem is to use a grounded container. Such a container may include conductive fibers that are electrically connected to ground to carry the electric charge from the surface of the bag. The conductive yarns may be interconnected and one or more connection points may be provided for an external ground source. For example, Canadian Patent 1,143,673 and U.S. Pat. No. 4,431,310 disclose a fabric construction based on polyolefin yarn having conductive fibers in the yarns. Alternatively, the fabric may be coated with a layer of plastic film having an outer metalized surface, such as disclosed in U.S. Pat. No. 4,833,088.

The use of a grounded container, however, works only as long as the container remains grounded. If the container becomes ungrounded, its ability to decrease the potential for an incendiary discharge is lost, and due to the higher capacitance of the conductive system, the discharge can be much more energetic and incendiary than conventional non-conductive containers. Specifically, if such a container is not grounded, a spark discharge may develop which is capable of igniting flammable vapors or dust clouds and therefore must be grounded during the fill and emptying operations to provide a path for electrical discharge. Additionally, fabrication of the conductive containers requires specialized construction techniques to ensure all conductive surfaces are electrically connected together for a ground source.

Another conventional approach to decreasing the potential for incendiary discharges in flexible containers has been directed toward decreasing the surface electrostatic field of the container. If the magnitude of the electrostatic field on the surface of a container is above a certain threshold level, the potential for an incendiary discharge due to the electrostatic charge exists. That threshold level is about −500 kilovolts per meter (kV/m) for intermediate bulk containers made from woven polypropylene fabric. By decreasing the surface electrostatic field below about −500 kV/m, the potential for an incendiary discharge is greatly decreased and believed to be rendered virtually non-existent. Attempts at reducing the surface electrostatic field level below about −500 kV/m have not, however, proven successful without proper grounding.

One such effort at decreasing surface electrostatic fields has focused on the creation of corona discharges. There are four basic types of electrostatic discharges: spark discharges; brush discharges; propagating brush discharges; and, corona discharges. Of the four electrostatic discharges, the spark, the brush and the propagating brush electrostatic discharges can all create incendiary discharges. The corona discharge is not known to create incendiary discharges for common flammable atmospheres.

By incorporating certain materials into the flexible fabric container, as the electrostatic field increases, corona discharges from such materials limit the maximum field. This electrostatic field level, however, is above the −500 kV/m threshold level at which the potential for incendiary discharge first appears. Examples of this conventional approach include U.S. Pat. No. 4,207,376 (Nagayasu), U.S. Pat. No. 4,989,995 (Rubenstein), U.S. Pat. No. 4,900,495 (Lin), U.S. Pat. No. 4,997,712 (Lin), U.S. Pat. No. 5,116,681 (Lin) and U.S. Pat. No. 5,147,704 (Lin).

Yet another approach to the problem of incendiary discharge has been to decrease the surface resistivity of a container by coating the container with an antistatic material. Such a coating on the container surface increases the threshold level of the potential for an incendiary discharge to about −1500 kV/m. However, the potential for an incendiary discharge is still a very real possibility. Examples of this approach include U.S. Pat. No. 5,151,321 (Reeves) and U.S. Pat. No. 5,092,683 (Wurr).

SUMMARY

The present invention alleviates the deficiencies of the prior art to a great extent by providing an ungrounded type flexible fabric container system with reduced electrostatic discharge for use in a combustible environment. The flexible fabric container is formed of woven fabric configured to have side walls, a closed end and an open end. The woven fabric further has an electric resistivity which allows flow of electricity through the fabric at a rate that causes discharges from the fabric of about one-hundred nanocoulombs (nC) or less when the fabric is charged at more than negative ten kilovolts.

The flexible fabric container may further include a plurality of quasi-conductive fibers positioned about one-half to about four inches apart from one another and having corona discharge points. The fibers are sized and shaped to effect corona discharge at the discharge points and have sufficient resistance to avoid discharge at its ends or along its length at a rate resulting in incendiary type discharges in combustible environments.

The flexible fabric container may include, in addition to the quasi-conductive fibers, a coating of a compound having antistatic properties applied to a surface of the walls. Further, the quasi-conductive fibers may be woven into the flexible fabric container.

The present invention further discloses a method for reducing electrostatic discharge in an ungrounded type flexible fabric container system for use in a combustible environment. The method includes the steps of providing a woven fabric which is configured to form the flexible fabric container having side walls, a closed end and an open end and adjusting the electrical resistivity of the woven fabric to allow the flow of electricity through the fabric at a rate that causes discharges from the fabric of about one-hundred nanocoulombs or less per individual discharge with the fabric charged at greater than about negative ten thousand volts.

A primary object of the present invention is to disclose a system with reduced electrostatic discharge including woven fabric configured into a flexible container and having sufficient electrical resistivity to allow discharges from the fabric of about one-hundred nanocoulombs or less when the fabric is charged to more than negative ten thousand volts.

Another object of the present invention is to disclose a flexible fabric container with a reduced potential for incendiary discharge using quasi-conductive fibers.

Another object of the present invention is to disclose a flexible fabric container including both quasi-conductive fibers and an antistatic coating compound. The quasi-conductive fibers may be woven into the fabric.

Another object of the present invention is to disclose a method for reducing electrostatic discharge in ungrounded type flexible fabric container systems by providing a flexible fabric container made from woven fabric and adjusting the electric resistivity of the woven fabric to allow the flow of electricity through the fabric at a rate allowing discharges of about one-hundred nanocoulombs or less when the fabric is charged at more than negative ten kilovolts.

Additional objects and advantages of the invention will be set forth in part in the discussion that follows and in part will be obvious from the description or may be learned by the practice of the invention. The object and advantages of the invention will be obtained by means of the instrumentalities and combinations particularly pointed out in the appended claims.

To achieve the objects and in accordance with the purpose of the invention as embodied and broadly described herein, the present invention provides for antistatic flexible fabric materials formed from woven, axially oriented crystalline polypropylene fiber. In one embodiment of the invention, the fabric is further characterized as having a coating of a flexible, thermoplastic polymer on one side of the fabric.

A particular advantage of the fabrics of the present invention is that specific surface resistivities, e.g., between $10^9$ and $10^{12}$ ohm/square ($\Omega/\square$), are achieved and when containers are normally constructed therefrom, need not be grounded during filling and emptying operations. As static charges are generated, the electrostatic charge can flow across the fabric and dissipate as low corona or low static discharges in the discharge channel. Thus, containers constructed from the fabrics of the present invention, under certain conditions, will not produce an incendiary static discharge, and do not require the use of a physical electrical ground.

To achieve the objects and in accordance with the purpose of the invention as embodied and broadly described herein, the present invention also provides for a quasi-conductive woven fabric section including quasi-conductive fibers. As an additional step, an antistatic coating can be applied to the woven fabric section. A coating with a specific surface resistivity range, for example an antistatic coating, can be applied so that it covers the entire surface, or it can be applied so that it covers a portion of the surface.

The present invention also provides a process for making flexible containers with a reduced potential for incendiary discharge made of woven fabric sections including the quasi-conductive fibers. In addition, a process is provided for making such flexible containers with a reduced potential for incendiary discharge that includes an antistatic coating on the containers, either over the entire surface or over a portion of the surface. By leaving a portion of the surface uncoated, the product packaged within the flexible containers can "breath," which is required in certain applications, such as in the transportation of talc or kaolin clay. While the coating of a portion of the surface can be applied in any pattern, applying the coating in strips allows for greater manufacturing efficiency. Furthermore, the strips can be either in the warp or the weft direction.

With these and other objects, advantages and features of the invention that may become hereinafter apparent, the nature of the invention may be more clearly understood by reference to the following detailed description of the invention, the appended claims and to the several drawings attached herein.

BRIEF DESCRIPTION OF THE DRAWINGS

A fuller understanding of the invention may be had by referring to the following description and claims taken in conjunction with the accompanying drawings, wherein:

DETAILED DESCRIPTION OF PREFERRED EMBODIMENTS

Figure 1:
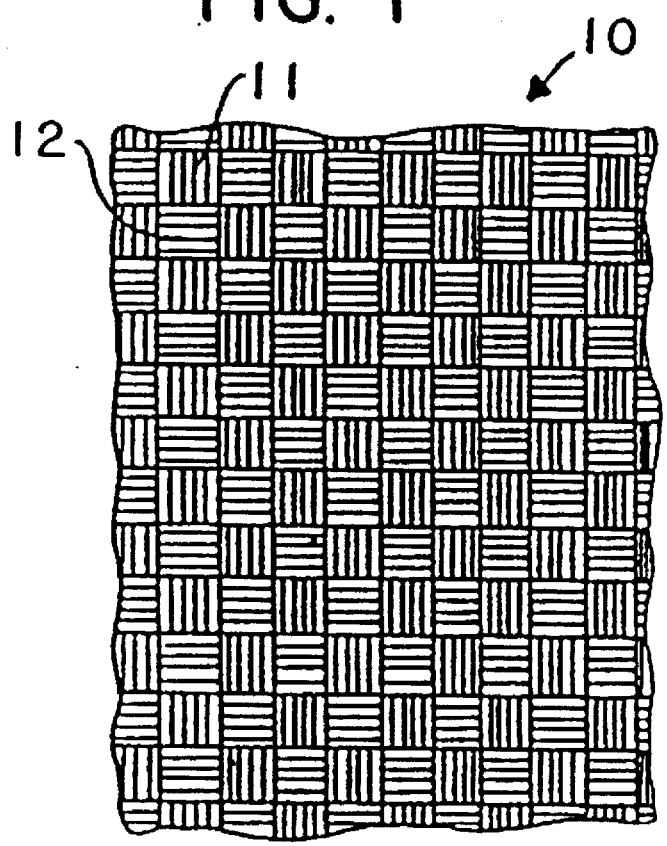
FIG. 1 is a schematic of the body of woven fiber material used in forming a fabric according to a preferred embodiment of the invention.

Referring now to the drawings, where like reference numerals indicate like elements, there is shown in FIG. 1 a woven fabric section 10 including vertically extending warp fibers 11 interwoven with horizontally extending weft or filling fibers 12. These fibers are interwoven by techniques well known in the art on a textile loom to form a sheet-like material relatively free of interstices. The tightness of the weave depends on the end use. Where the fabric is to be used to form containers for holding large particle size bulk material such as tobacco or pellets, then a fairly open weave of mono or multifilament fiber may be used in a count range of from about 1000 to 3000 denier in each weave direction.

The fibers may be composed of a tight weave of axially oriented polypropylene flat tape material having a preferred thickness of from about 0.5 to about 2 mils and a preferred width of from about 50 to about 250 mils. It will be appreciated that by use of the flat tape fibers, maximum coverage is obtained with the least amount of weaving since it requires relatively few flat fibers per inch to cover a given surface as compared to fibers of circular cross section. It is important that the ribbon-like fibers be highly oriented monoaxially in the longitudinal direction or biaxially in the longitudinal and transverse directions. This is accomplished by so drawing the flat fiber or the web from which flat fiber ribbons are slit, so as to irreversibly stretch the fiber or web, thereby orienting the molecular structure of the material. In biaxially oriented fibers or sheeting, the material is hot or cold-stretched both in the transverse and longitudinal directions, or instead may be carried out mainly in the longitudinal direction or mainly in the transverse direction.

When axially oriented polypropylene fibers are interwoven, they cross over in the warp and weft directions, and because of their high tear and tensile strength, as well as their hydrophilic properties, the resultant fabric is highly stable. Thus the bag, if properly seamed, is capable of supporting unusually heavy loads without sagging or stretching of the walls of the bag.

Figure 2:
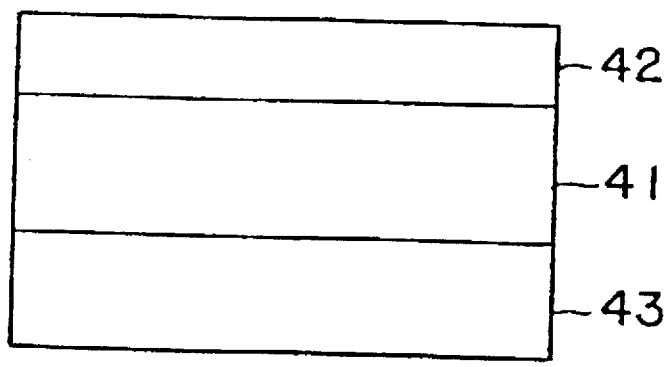
FIG. 2 is a schematic of a laminated structure according to another preferred embodiment of the invention.

FIG. 2 represents another embodiment of the present invention. Layer 41 is a weave of polypropylene flat ribbon fibers also of the type described above that contains a coating of thermoplastic polymer material (42, 43) adhered to both sides of the fabric.

The purpose of the thermoplastic coating 42, 43 in FIG. 2 is primarily to seal the interstices of the fiber weave to prevent leakage of any finely divided contents of containers made from the fabric, and also to impart moisture barrier properties to containers or in other fabric applications such as tarpaulin or tent fabrics. In the present invention, the thermoplastic coating may also serve as a dispersing base for an antistatic agent which helps impart antistatic properties to the fabric as more fully discussed below.

The thermoplastic coating may be composed of any thermoplastic polymer composition which is sufficiently non-brittle so that the flexible characteristics of the woven fabric are not seriously diminished and which is adherable to the polypropylene fiber material forming the fabric base. Preferred thermoplastics are disclosed in copending U.S. patent application Ser. No. 08/139,113, which is incorporated herein by reference in its entirety.

The thermoplastic coating may be applied to one or both surfaces of the woven fabric by techniques known in the art such as extrusion coating, dip coating, and spray coating. Generally speaking, the coating may be applied to a dry coating thickness within the range of from about 0.5 to about 3.0 mils, preferably from about 0.8 to about 1.5 mils.

It is to be understood that the application of the teaching of the present invention to a specific problem will be within the capabilities of one having ordinary skill in the art in light of the teachings contained herein.

Test data indicates that by coating the surface of the fabric the surface resistivity is reduced by a factor of about 10 to 100. Also, test data indicates that the best static discharge incendiary control properties, in the range of relative humidities previously described, are achieved with a surface resistivity range between $10^9$ and $10^{12}$ $\Omega/\square$.

The use of certain materials having a surface resistivity range between $10^9$ and $10^{12}$ $\Omega/\square$ results in a system having low incendiary static discharge. While the invention heretofore described is primarily directed to the use of such a material in the formation of an antistatic fabric, the certain materials may also be used in other circumstances when it is desirable to dissipate static electricity and minimize resulting incendiary static discharge. An example of such a use is the inside of a silo or grain container, conveying equipment, or other applications where electrostatic discharge will result in a spark discharge.

The present invention is also directed to a quasi-conductive woven fabric section including quasi-conductive fibers. Quasi-conductive fibers are disclosed in copending U.S. patent application Ser. No. 08/252,660, now U.S. Pat. No. 5,478,154, which is incorporated herein by reference in its entirety. As an additional step, an antistatic coating can be applied to the woven fabric section. A coating with a specific surface resistivity range, for example an antistatic coating, can be applied so that it covers the entire surface, or it can be applied so that it covers a portion of the surface.

Figure 3:
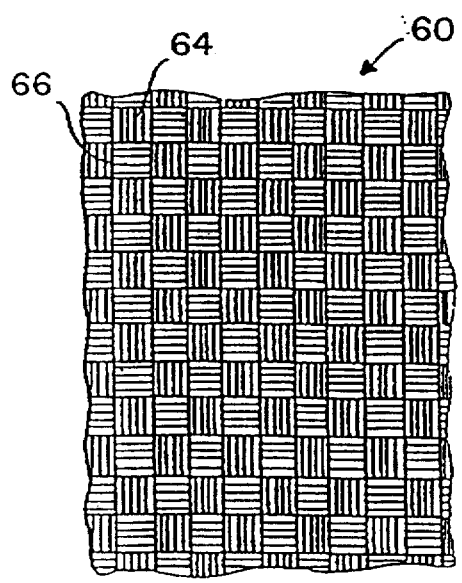
FIG. 3 is a partial view of a woven fabric section including fibers in the warp and weft directions.

FIG. 3 shows a woven fabric section 60 including vertically extending warp fibers 64 interwoven with horizontally extending weft or filling fibers 66. These fibers are interwoven by techniques well known in the art on a textile loom to form a sheet-like material relatively free of interstices.

Figure 4:
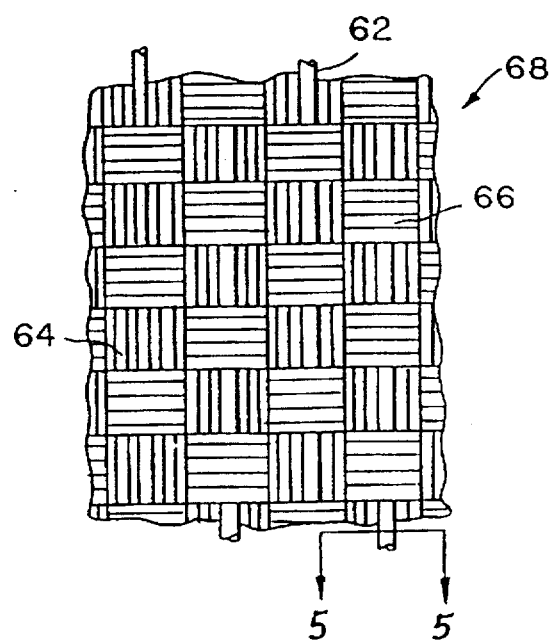
FIG. 4 is a partial view of a woven fabric section including quasi-conductive fibers woven in the warp direction.

Shown in FIG. 4 is a quasi-conductive fabric section 68 that includes the warp fibers 64, the weft fibers 66 and quasi-conductive fibers 62, which are woven with and in parallel to some of the warp fibers 64. It is to be understood that quasi-conductive fibers 62 may consist of a single fiber, or be a combination of fibers woven or otherwise interconnected to make a fiber. While the quasi-conductive fibers 62 are shown parallel to the warp fibers 64, they could be positioned parallel to the weft fibers 66. Furthermore, while the quasi-conductive fibers 62 are shown in FIG. 4 in a standard over one—under one pattern, the fibers 62 can be woven in any pattern or otherwise included within fabric section 68 in any manner which provides comparable antistatic properties.

A quasi-conductive fabric conducts sufficiently to effect corona discharge, but not in a manner sufficient to substantially effect incendiary discharges. One embodiment of a quasi-conductive fabric may include quasi-conductive fibers. A quasi-conductive fiber effects corona discharge, such as at its ends or at other discharge points, but has sufficient resistance to substantially avoid incendiary discharge at its ends or along its length at a rate that results in incendiary type discharges. One embodiment of a quasi-conductive fiber may include a relatively conductive core, at least partially ensheathed in a relatively quasi-conductive or non-conductive material. Other configurations could include a fiber having a substantially homogeneous material or a relatively more heterogeneous mixture of materials with larger regions of different materials relative to the fiber 62 diameter. Additionally, the fiber 62 could include more than one sheath-type layer. Therefore, while certain combinations have been illustrated herein for the quasi-conductive fibers of the invention, there could be other configurations which include components of conductive, quasi-conductive, and non-conductive materials that would fall within the scope of the invention.

Furthermore, while quasi-conductive fibers have been shown to be woven into woven fabric portions, it is to be understood that the quasi-conductive fibers may instead be dispersed or otherwise positioned upon the fabric portions. In addition, the quasi-conductive fibers may be dispersed within the antistatic coating and applied to the fabric portions with the application of the coating.

Figure 5:
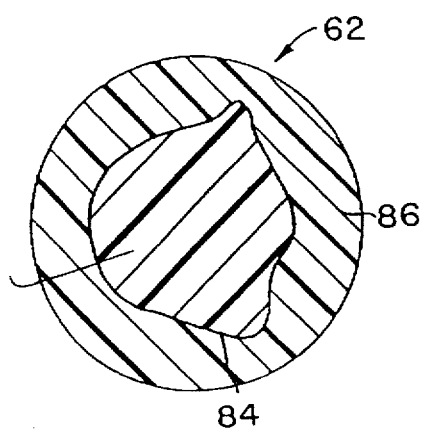
FIG. 5 is a cross-sectional view of a preferred embodiment of a single filament of the quasi-conductive fiber of FIG. 4, taken along line 5—5.

Conductive materials that may result in incendiary discharges have a surface resistivity on the order of $10^5$ $\Omega/\Box$ and below. Non-conductive materials generally have a surface resistivity on the order of $10^{12}$ to $10^{13}$ $\Omega/\Box$ and above. Antistatic coating materials, which are an example of coatings of materials with a specific surface resistivity range used in described embodiments of the present invention, have a surface resistivity on the order of $10^9$ to $10^{12}$ $\Omega/\Box$. Insulating sheath material, as is used in one embodiment of the quasi-conductive fiber, may have an electrical resistivity per length on the order of $10^8$ ohms per meter ($\Omega/m$). FIG. 5 is a cross-sectional view of the quasi-conductive fiber 62 taken along line 5—5 of FIG. 4. The quasi-conductive fiber 62 contains a relatively conductive portion 84 and an insulating sheath portion 86. The relatively conductive portion 84 may take other shapes, and thus the present invention is not limited to the conductive core shape depicted in FIG. 5. The quasi-conductive fiber 62 is one embodiment of quasi-conductive fibers. Other embodiments may not include distinct conductive cores with quasi-conductive sheaths.

One currently available fiber that may be adapted to be used as a quasi-conductive fiber, like the embodiment of fiber 62, is a P-190 fiber made by DuPont. The effectiveness of the claimed quasi-conductive woven fabric sections including quasi-conductive fibers in reducing the potential for incendiary discharge was tested by incorporating the P-190 multifilament fiber into various woven bulk containers made of a standard 6.5 ounce (180 gram) white fabric at about one-half inch to about four inch (1.3 to 10 centimeter) spacings with and without antistatic coatings of glycerol monostearate (GMS) and measuring, while the bag is being filled and emptied (a "fill/empty trial"), the number of gas ignitions which resulted upon the deliverance of a combustible gas mixture onto the surface of the bulk containers.

Out of over one thousand fill/empty trials, no probe ignitions were observed for fabrics having an antistatic coating and quasi-conductive fibers. Fabrics without antistatic coating and quasi-conductive fibers were also tested. In two-hundred and seventy fill/empty trials of such fabrics, two-hundred and seventy ignitions were observed. In all of these tests, the fabrics were charged as high as −53 kV. These results indicate that the claimed quasi-conductive woven fabric sections including quasi-conductive fibers are highly effective at reducing the potential for incendiary discharge in woven bulk containers when P-190 fibers, with or without GMS, are incorporated as the quasi-conductive fibers.

Figure 10:
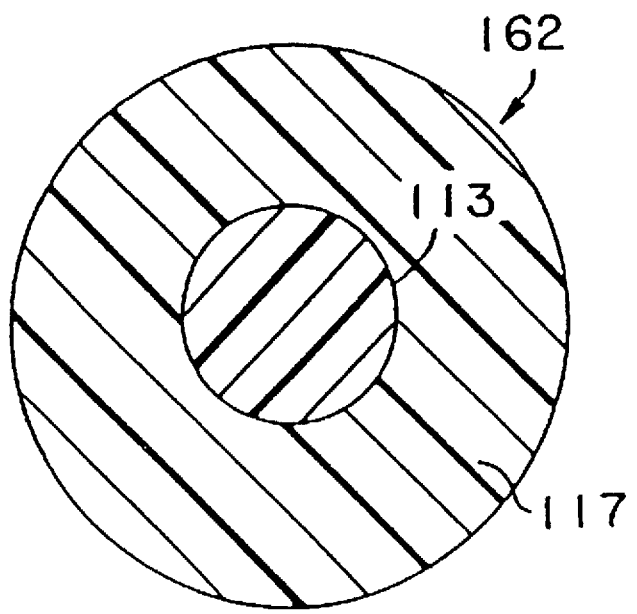
FIG. 10 is a cross-sectional view of another preferred embodiment of a single filament of a quasi-conductive fiber according to the present invention.

FIG. 10 is a cross-sectional view of a second embodiment of a single filament of a quasi-conductive fiber 162. The quasi-conductive fiber 162 includes a conductive core 113 and a non-conductive sheath 117.

Figure 11:
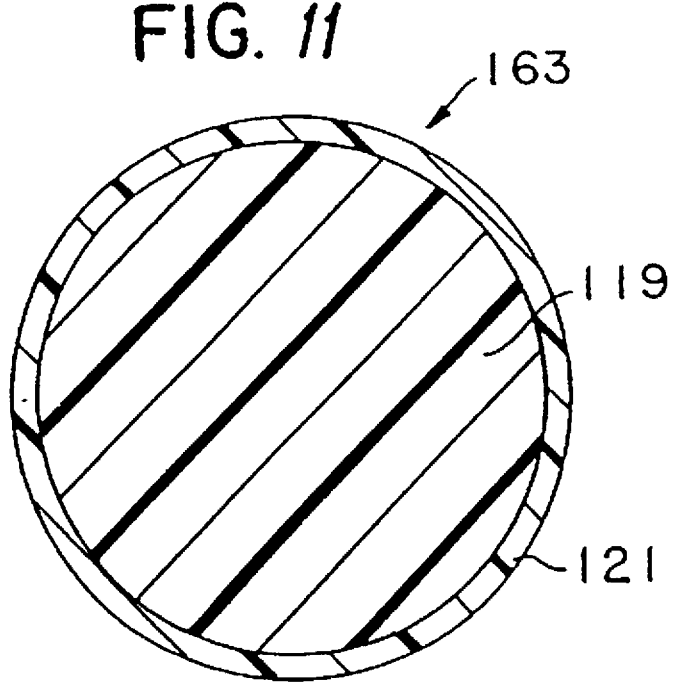
FIG. 11 is a cross-sectional view of another preferred embodiment of a single filament of a quasi-conductive fiber according to the present invention.

FIG. 11 is a cross-sectional view of a third embodiment of a single filament of a quasi-conductive fiber 163. The quasi-conductive fiber filament 163 includes an insulative core 119 and a conductive outer sheath 121.

The effectiveness of the claimed quasi-conductive woven fabric sections including quasi-conductive fibers in reducing the potential for incendiary discharge was tested by separately incorporating the fibers 162 and 163 into multifilament fibers and woven bulk containers made of standard 6.5 ounce white (polypropylene) fabric at 1 inch spacings with antistatic coatings of about 6 percent GMS and measuring during a fill/empty trial the number of gas ignitions which resulted upon the deliverance of a combustible gas mixture onto the surface of the bulk containers.

The maximum electric field strength measured during the trials was substantially similar to that measured with the woven bulk containers including P-190 fibers. Out of about 200 fill/empty trials, no ignitions resulted. These results indicate that the claimed quasi-conductive woven fabric sections including quasi-conductive fibers are highly effective at reducing the potential for incendiary discharge in woven bulk containers when fibers 162 and 163 are incorporated as the quasi-conductive fibers.

Figure 6:
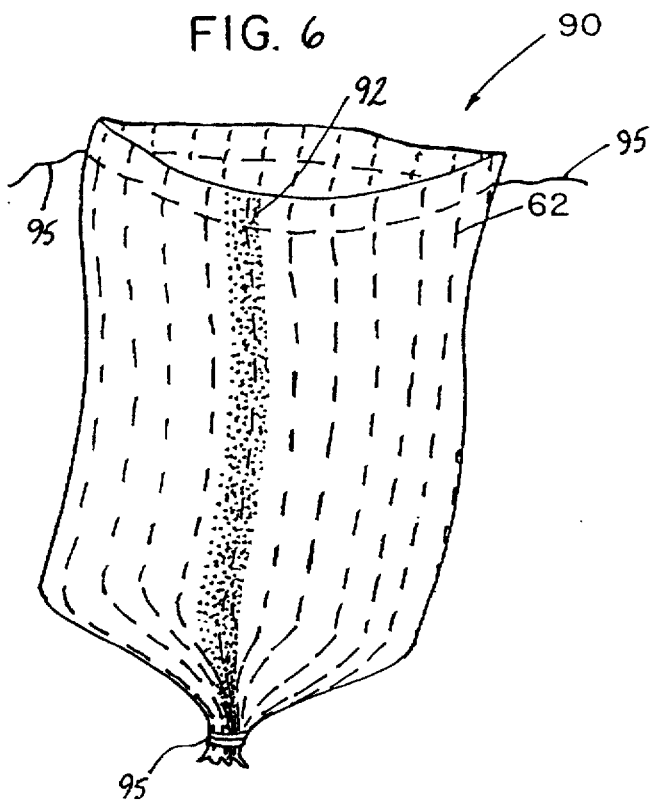
FIG. 6 is a side view of a woven flexible fabric container including quasi-conductive fibers and further including a strip of an antistatic coating.

According to the present invention, as an electrostatic field begins to accumulate on the flexible container 90 including quasi-conductive fibers 62 (as shown in FIG. 6), a localized zero potential charge is created at some midline between the quasi-conductive fibers 62. This causes a potential to be created between that midline and the quasi-conductive fibers 62, causing electrons to migrate into the quasi-conductive fibers 62.

The quasi-conductive fibers 62 have a resistivity that prevents an incendiary discharge from occurring from the fiber surface. This is due to the insulating sheath 86 surrounding the conductive core 84. The electric energy instead travels down the length of the quasi-conductive fiber cores 84 and exits the ends of the quasi-conductive fibers 62 as a corona discharge. The multifilament fiber exhibited a corona discharge threshold voltage at its ends in the range of about three to about four kilovolts. Further, the fiber, when formed into a loop exhibited a corona discharge threshold voltage at its loop end of about nine kilovolts.

If conductive fibers were to be used instead of quasi-conductive fibers 62, the capacitance of the system would be increased and a larger charge of energy may develop. If a ground approaches the ascribed conductive system, an energetic discharge may occur at such a level as to be incendiary.

Quasi-conductive fibers 62 can be used in flexible intermediate bulk containers 90 either by themselves or in conjunction with an antistatic coating 92 (as shown in FIG. 6). Container 90, as shown in FIG. 6, includes side walls, and drawstrings 95 on either end to close the ends of container 90 for filling. Flexible intermediate bulk containers are used to transport finely divided solids such as cement, fertilizer, salt, sugar and barite as well as virtually any type of finely divided solids. An antistatic coating 92 may be applied to cover the entire surface of the flexible fabric container 90 or a portion of the surface as depicted in FIG. 6. While the coating 92 shown in FIG. 6 is substantially parallel to fibers 62, the coating 92 may be applied substantially perpendicular to fibers 62 or at other angles.

Figure 7:
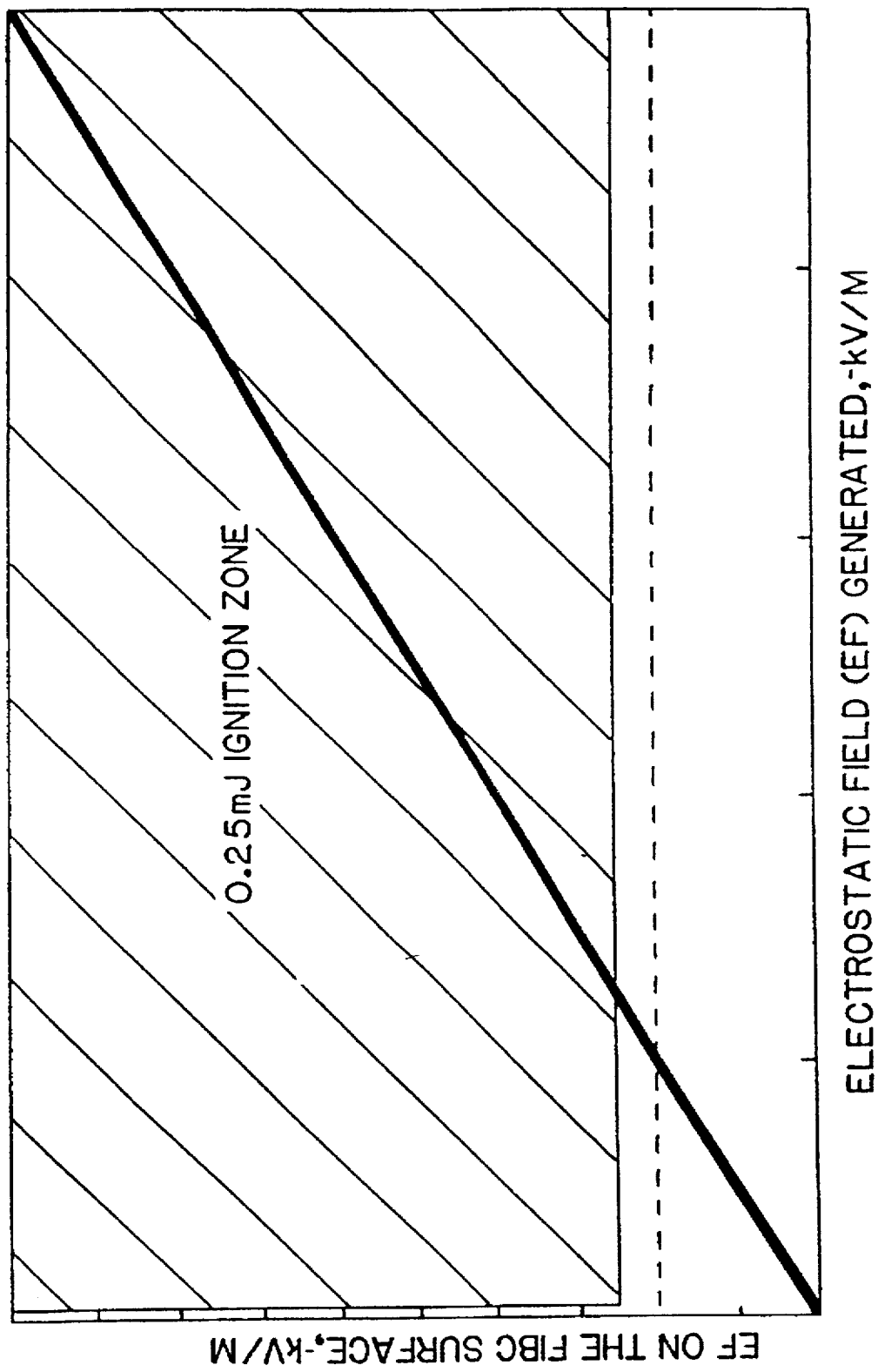
FIG. 7 is a graph depicting the potential for incendiary discharge on a conventional flexible intermediate bulk container.
Figure 8:
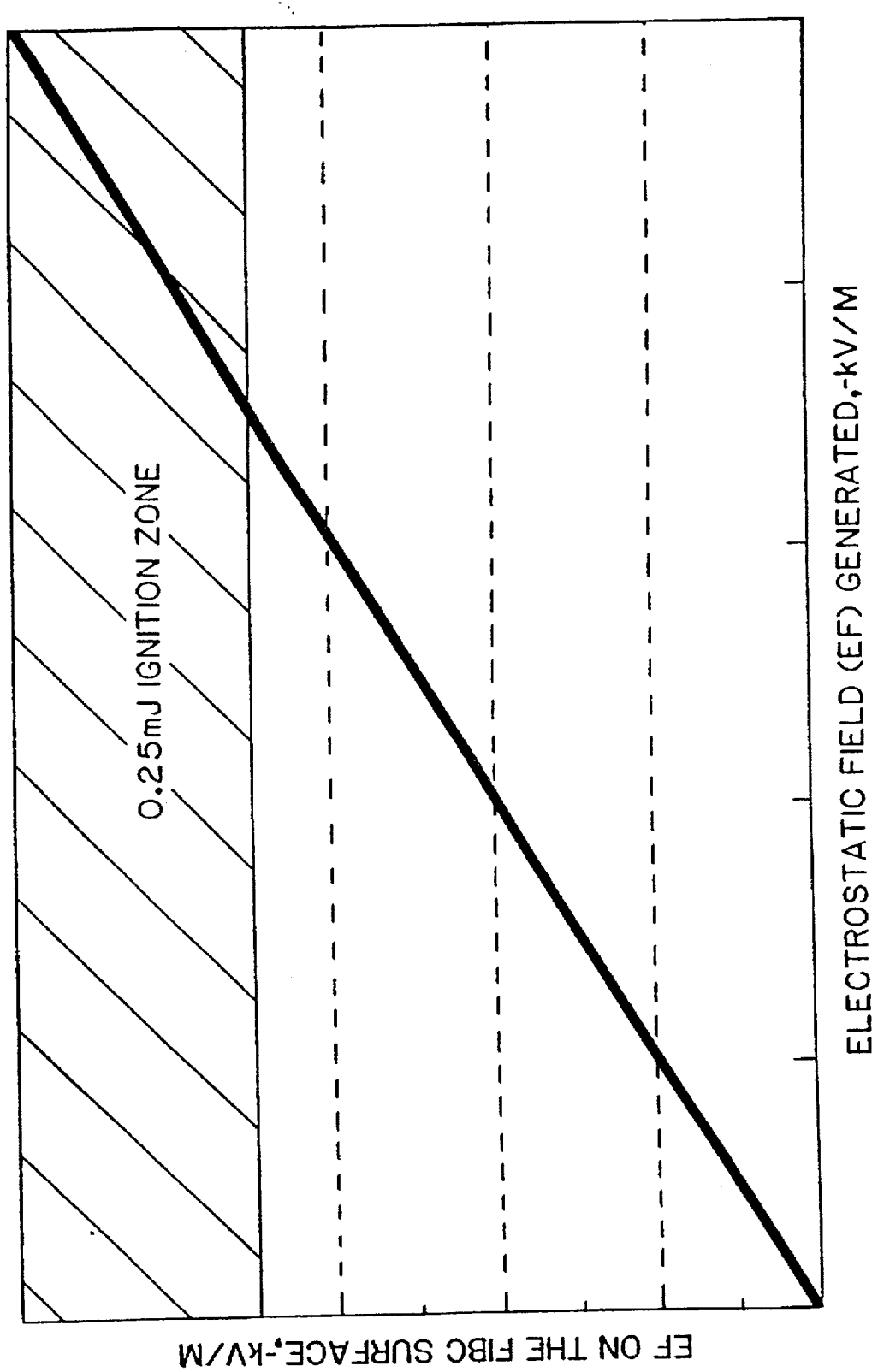
FIG. 8 is a graph depicting the potential for incendiary discharge on a flexible intermediate bulk container which has antistatic coating.
Figure 9:
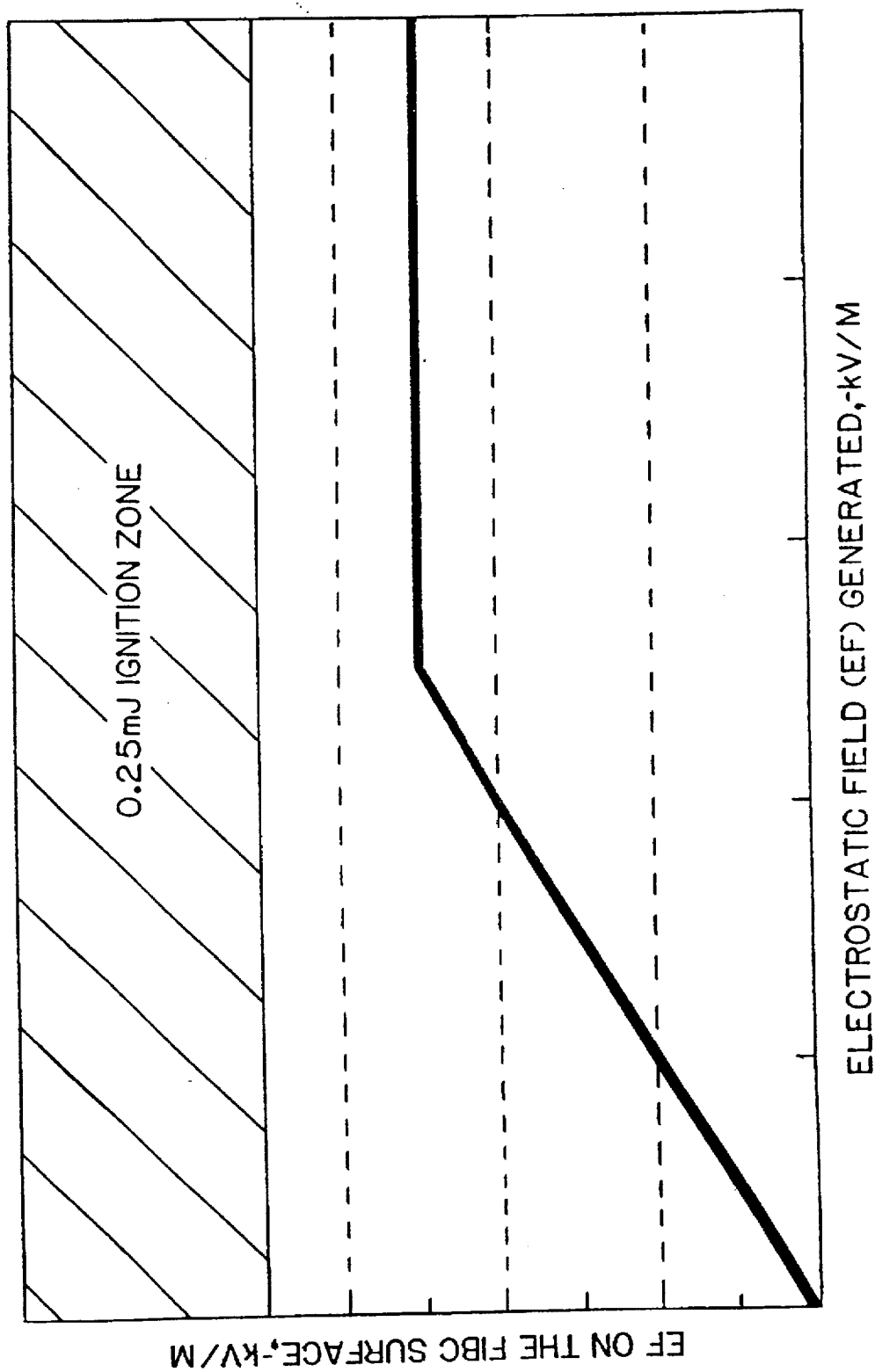
FIG. 9 is a graph depicting the potential for incendiary discharge on a flexible intermediate bulk container including quasi-conductive fibers and an antistatic coating.

Antistatic coatings 92 cause the threshold level for the potential for an incendiary charge to be increased. With reference to FIGS. 7-9, the utility of antistatic coatings 92 and quasi-conductive fibers 62 is shown. FIG. 7 depicts the ignition profile of a flexible fabric container that does not have an antistatic coating 92 or quasi-conductive fibers 62. As shown in FIG. 7, the threshold level at which an incendiary charge can occur is at about –500 kilovolts per meter (kV/m).

With reference to FIG. 8, an ignition profile is depicted for a flexible fabric container with an antistatic coating 92 applied over the entire surface of the container. As can be seen in FIG. 8, the threshold ignition level has been raised to about –1500 kilovolts per meter. Tests have further shown that a flexible fabric container that is coated with an antistatic coating 92 covering approximately one-half of the container in strips has its ignition threshold raised above the level exhibited by uncoated flexible fabric containers.

FIG. 9 depicts the ignition profile of the flexible container 90 including the antistatic coating 92 and the quasi-conductive fibers 62. As is apparent from FIG. 9, the ignition zone threshold is higher than the electrostatic field that can accumulate on the surface of the flexible fabric container 90. The result is that the flexible fabric container 90 including the quasi-conductive fibers 62 has a threshold electrostatic field on the surface of the container 90 that is no greater than approximately –900 kV/m. This is well below the ignition zone profile of about –1500 kV/m caused by the use of the antistatic coating 92. The result of a threshold electrostatic field on the container 90 being below the ignition zone profile of the coating 92 occurs whether the coating 92 covers the entire surface of container 90 or only about one-half of the surface. In this way, the potential for incendiary discharge in flexible containers is significantly decreased.

Figure 12:
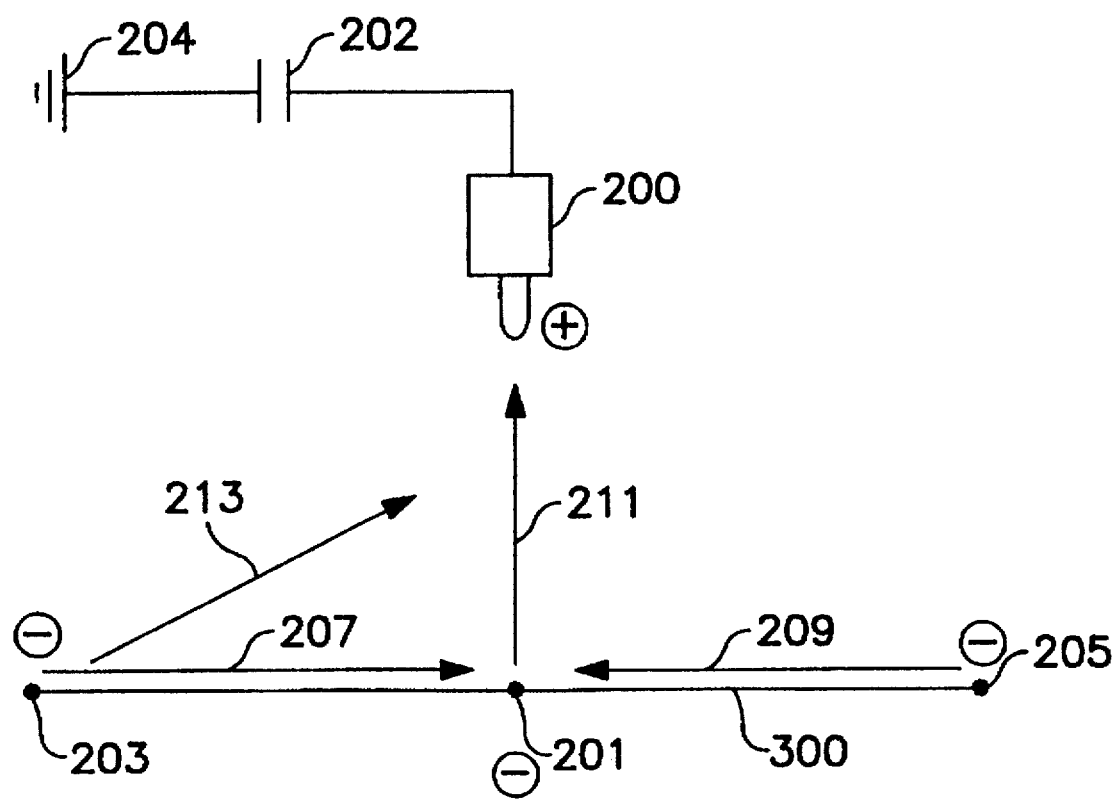
FIG. 12 is a schematic view of electrostatic charge migration along a fabric material of a preferred embodiment according to the present invention.

The system according to the present invention is believed to control the rate of migration of electrostatic discharges. Experiments run on fabrics of preferred embodiments of the present invention show this capability. With reference to FIG. 12, a combustible gas-emitting probe 200 is placed a distance above an electrostatically charged fabric material 300. An electric surface potential exists between the probe 200 and the fabric 300. Probe 200 was electrically connected to a ground 204 through a capacitor 202, in this instance a polypropylene capacitor rated to 220 nanofarad. The gas mixture emitted from probe 200 was 5% by volume of propane in air, with a total flow rate of about 10.5 liters/minute. This gas mixture was chosen to provide a localized flammable atmosphere capable of being ignited by discharges having an equivalent spark energy of 0.25 millijoules (mJ), the minimum ignition energy of common flammable vapors.

The fabric 300 was electrostatically charged by placing an earthed disc covered with a sheet of Melinex™ insulation close to the underside of the fabric material 300. With fabric 300 chosen of a type of fabric as described with respect to FIG. 3, the surface of the disc closest to fabric 300 was charged with a corona at about negative 10 to about negative 20 kV from a multiple of discharge wires, thus increasing the surface potential of the fabric material to about negative 37 kV. The disc was then removed. Attempts to charge a fabric 300 of the type described with respect to FIG. 4 and including both an antistatic coating 90 and quasi-conductive fibers 62 in the same manner as the fabric as shown in FIG. 3 resulted in a surface potential of only about negative 20 kV.

Figure 13:
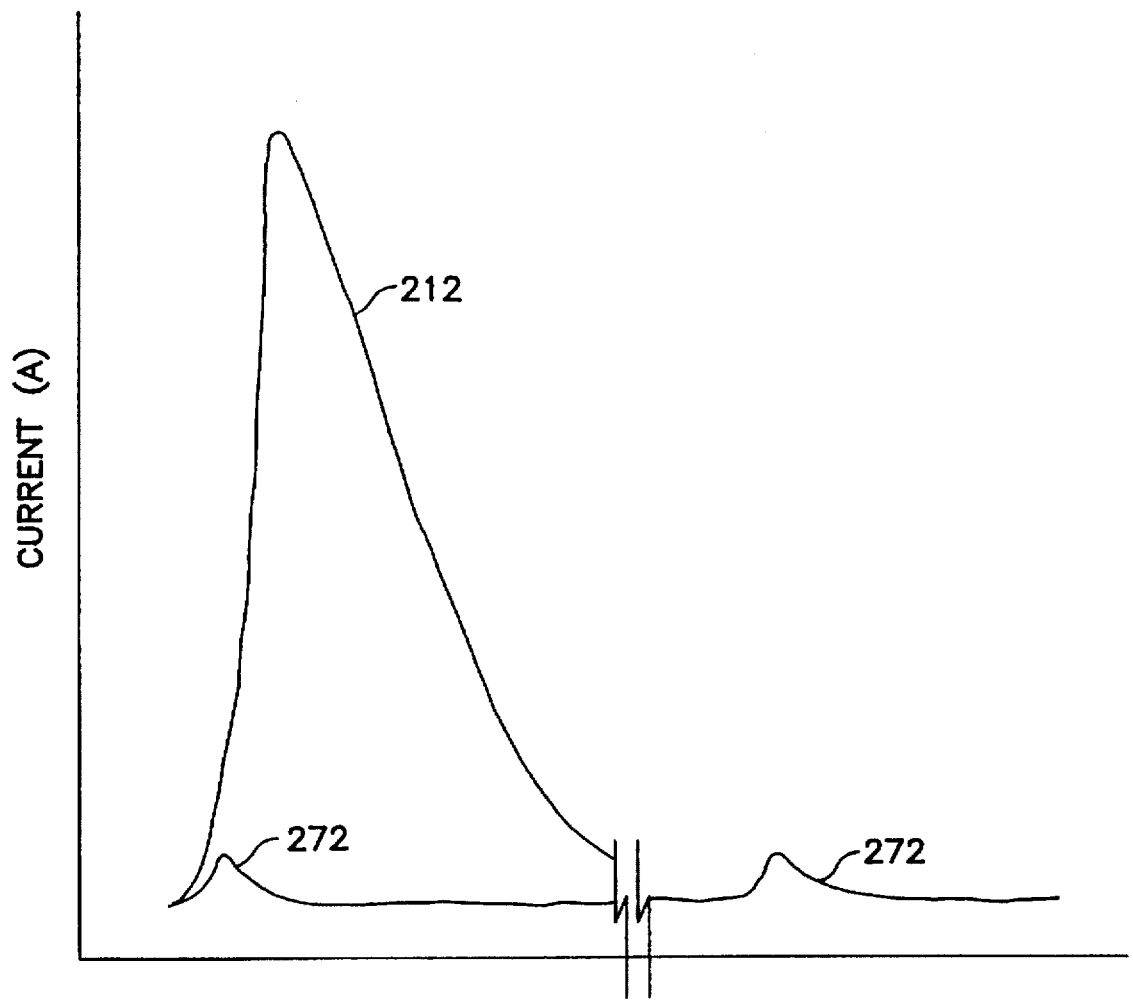
FIG. 13 is a graph view of electrostatic discharges coming from fabric materials of preferred embodiments according to the present invention.

Discharges were observed between the probe 200 and the fabric material. One discharge, having 73 nanocoulombs (nC) of charge, occurred with the probe 200 separated by a distance of 50 mm from the fabric. Another test showed a 200 nC charge discharge with the probe 200 separated by a distance of 200 mm from the fabric. Yet another test showed a 110 nC charge discharge separated by a distance of 40 mm from the fabric. These test results were measured with an oscilloscope. With reference to FIG. 13, the graph shows the 110 nC discharge between fabric material 10 and probe 200. The results of the tests run on fabric material 10 charged to about negative 40 kV indicate that some of the static discharges would be incendiary.

With reference to FIG. 12, when a spark occurs because of the electrical potential between probe 200 and the fabric 300, there is a migration of charge from the fabric material toward the probe 200. The charge migrates along the pathway of least resistance. Thus, in fabrics with a relatively low surface resistivity, such as fabric material 60, charge may migrate in a region proximate the position 201, such as from positions 203 and 205, through the material in the direction of arrows 207 and 209 toward the closest position 201 to the probe 200, and continue from position 201 toward the probe 200 through the atmosphere in the direction of arrow 211. Further, if the surface resistivity is relatively high, the charge, which follows the path of least resistance, instead follows a path through the atmosphere toward probe 200 in the direction of arrow 213. The total discharge from fabric material 60, which was stored in capacitor 202, is shown as the area under line 212 on FIG. 13, which is approximately 110 nC.

As the surface resistivity is adjusted by the appropriate configuration of quasi-conductive fibers and/or coating (and/or other means that may be employed) to a level between being relatively high and being relatively low, such as in a fabric 300 including both an antistatic coating 92 and quasi-conductive fibers 62, the path of least resistance is along the fabric, but the resistance is sufficient so as to restrict the flow of charge to a rate giving a discharge of about four to about fifteen nanocoulombs. The quasi-conductiveness prevents the fabric in the region from recharging quickly enough to sustain a large simultaneous discharge such as shown by line 212 on FIG. 13. Instead, in the embodiment tested, it is believed that quasi-conductive fibers 62 and antistatic coating 92 in conjunction control the electron migration at a slower rate in the direction of arrows 207 and 209 from such a fabric 300 to probe 200. It is believed that the slower migration rate in the direction of arrows 207 and 209 causes multiple spark discharges 272 to occur from such a fabric 300. None of the spark discharges, however, have enough energy to be incendiary. Also, the quasi-conductive fibers 62 in such a fabric 300 may lead to the creation of corona discharges which contribute to the dissipation of the charge on the fabric.

In tests run on fabric 300 having antistatic coating 92 and quasi-conductive fibers 62, a roughly similar amount of charge was stored in capacitor 202, about 110 nC. However, the charge stored in capacitor 202 from such a fabric 300 occurred from the multiple spark discharges, each having a lower individual energy. It is believed that the amount of charge transfer in each discharge was on the order of 4 nC, as shown by the area under line 272 on FIG. 13 and to about 15 or 20 nC as shown by subsequent tests.

Thus, unlike prior systems which attempt to control the level of charge or surface potential on the fabric, the present system, when releasing charge from a region on the fabric through a discharge, produces not a single discharge by which all of the electrical energy is released, but rather a number of individual discharges of low energy, less than that required to produce combustion in a combustible atmosphere, typically a minimum of 0.25 mJ. Accordingly, the charge on the system may be high, about negative 10 kV to about negative 53 kV, and still produce discharges which are not incendiary.

Figure 14:
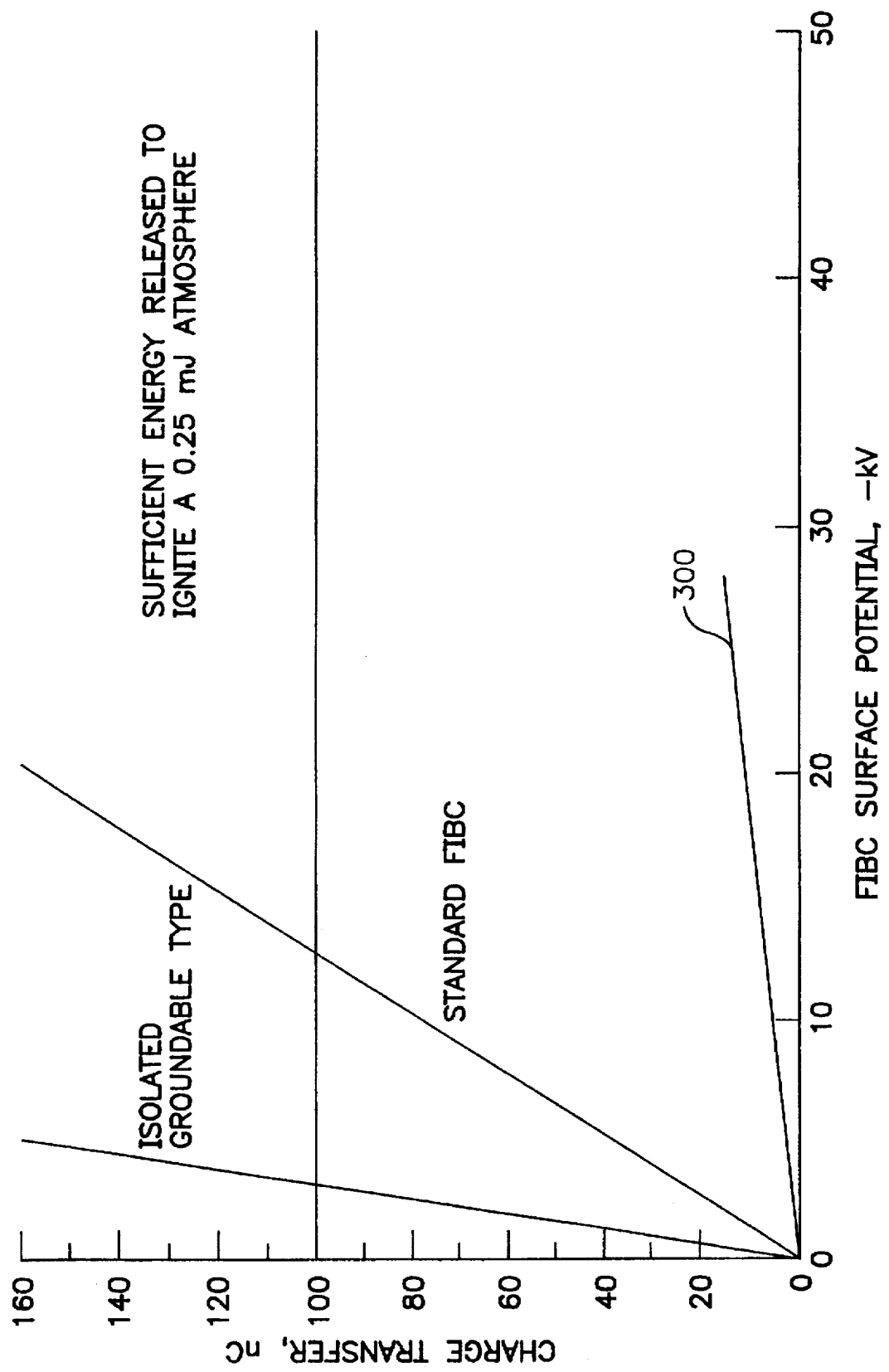
FIG. 14 is a graph view of individual charge transfers stemming from surface potentials of two standard materials and a material of a preferred embodiment according to the present invention.

FIG. 14 shows the effect that surface potential has on charge transfers coming in single discharges from three different fabric materials. One type is a groundable type of container which is not grounded. Another type is a woven fabric container without antistatic coating or quasi-conductive fibers. The final type is fabric 300 having antistatic coating 92 and quasi-conductive fibers 62. As FIG. 14 shows, with an increasing surface potential, the intensity of a single discharge increases in each fabric type. Only fabric 300, however, was observed to have single discharges at higher surface potentials well below the level of energy sufficient to ignite a 0.25 mJ atmosphere, about one-hundred nC. The ungrounded, groundable type and the fabric without the coating or quasi-conductive fibers each displayed single discharges above about one-hundred nC, the former at below negative 10 kV surface potential and the latter at below negative 20 kV surface potential.

While the present invention has been described in relation to its use in flexible fabric containers, there are other applications envisioned. Examples of other applications include use in pneumatic conveyor tubes or gravity slides or as liners in other containment vessels that transport products in situations where triboelectric charging may take place.

What is new and desired to be protected by Letters Patent of the United States is:

1. An ungrounded flexible fabric container system with a reduced energy of electrostatic discharge for use in a combustible environment comprising: a woven fabric configured to form the flexible fabric container having side walls, a closed end and an open end; and said woven fabric having an electrical resistivity to allow the flow of electricity through the fabric at a rate to discharge of below about one-hundred nanocoulombs per individual discharge with the fabric charged at greater than about negative ten thousand volts.

2. A system as in claim 1 wherein said woven fabric has an electrical resistivity to allow the flow of electricity through the fabric at a rate to discharge of between about four nanocoulombs to about fifteen nanocoulombs per individual discharge with the fabric charged at greater than about negative ten thousand volts.

3. A system as in claim 1 wherein said fabric includes a plurality of quasi-conductive fibers positioned preferably about one-half to about four inches apart from one another and having corona discharge points, said fibers being composed of materials and sized and shaped to effect corona discharge at said discharge points, and to have sufficient resistance to avoid incendiary discharge at its ends or along its length at a rate that results in incendiary type discharges in the combustible environment.

4. A system as in claim 3 wherein said quasi-conductive fibers are composed of multifilaments.

5. A system as in claim 4 wherein said fabric includes a coating of a compound having antistatic properties applied to cover a surface of said walls.

6. A system as in claim 5 wherein said quasi-conductive fibers are woven into the fabric container.

7. A system as in claim 6 wherein said quasi-conductive fibers are positioned preferably about one to about four inches apart from one another.

8. A system as in claim 7 wherein each said multifilament of said quasi-conductive fibers includes a conductive core and an insulating sheath.

9. A system as in claim 8 wherein said quasi-conductive fibers are sized and shaped to have a corona discharge threshold voltage at their ends in the range of about three to about four kilovolts and an end of a looped one of said sized and shaped quasi-conductive fibers has a corona discharge threshold voltage of about nine kilovolts.

10. A system as in claim 9 wherein the fabric container is a flexible intermediate bulk container.

* * * * *

UNITED STATES PATENT AND TRADEMARK OFFICE
CERTIFICATE OF CORRECTION

PATENT NO. : 5,679,449
DATED : October 21, 1997
INVENTOR(S) : Vahid Ebadat, George M. Milner, and Robert J. Pappas Page 1 of 1

It is certified that error appears in the above-identified patent and that said Letters Patent is hereby corrected as shown below:

Column 1,
Before BACKGROUND, please add:

-- This application is a continuation-in-part of U.S. Application No.08/139,113, filed October 21, 1993, now abandoned, and of U.S. Application No. 08/252,660, filed June 1,1994, now U.S. Patent No. 5,478,154, and of International Application No. PCT/US94/12097, filed October 21,1994, now abandoned. --

Signed and Sealed this

Twenty-eighth Day of August, 2001

*Attest:*

*Attesting Officer*

NICHOLAS P. GODICI
*Acting Director of the United States Patent and Trademark Office*

(12) EX PARTE REEXAMINATION CERTIFICATE (6061st)
United States Patent
Ebadat et al.

(10) Number: US 5,679,449 C1
(45) Certificate Issued: Dec. 25, 2007

(54) LOW DISCHARGE ANTI-INCENDIARY FLEXIBLE INTERMEDIATE BULK CONTAINER

(75) Inventors: Vahid Ebadat, Lawrenceville, NJ (US); George M. Milner, Summerville, SC (US); Robert J. Pappas, Mt. Pleasant, SC (US)

(73) Assignee: Linq Industrial Fabrics, Inc., Summerville, SC (US)

Reexamination Request:
No. 90/008,488, Feb. 5, 2007

Reexamination Certificate for:
Patent No.: 5,679,449
Issued: Oct. 21, 1997
Appl. No.: 08/457,441
Filed: Jun. 1, 1995

Certificate of Correction issued Aug. 28, 2001.

Related U.S. Application Data

(63) Continuation-in-part of application No. PCT/US94/12097, filed on Oct. 21, 1994, now abandoned, and a continuation-in-part of application No. 08/252,660, filed on Jun. 1, 1994, now Pat. No. 5,478,154, and a continuation-in-part of application No. 08/139,113, filed on Oct. 21, 1993, now abandoned.

(51) Int. Cl.
*D04H 1/58* (2006.01)

(52) U.S. Cl. .................. 442/110; 428/374; 428/368; 428/397; 428/373; 383/67; 383/105; 383/113; 383/116; 383/117

(58) Field of Classification Search .................. None
See application file for complete search history.

(56) References Cited

U.S. PATENT DOCUMENTS

| | | | |
|---|---|---|---|
| 4,207,376 A | 6/1980 | Nagayasu et al. | |
| 4,431,316 A | 2/1984 | Massey | |
| 4,900,495 A | 2/1990 | Lin | |
| 4,989,995 A | 2/1991 | Rubenstein et al. | |
| 4,997,712 A | 3/1991 | Lin | |
| 5,071,699 A | 12/1991 | Pappas et al. | |
| 5,092,683 A | 3/1992 | Wurr | |
| 5,116,681 A | 5/1992 | Lin | |
| 5,147,704 A | 9/1992 | Lin | |
| 5,151,321 A | 9/1992 | Reeves et al. | |
| 5,202,185 A | 4/1993 | Samuelson | |
| 5,478,154 A | 12/1995 | Pappas et al. | |
| 5,512,355 A | 4/1996 | Fuson | |
| 5,679,449 A | 10/1997 | Ebadat et al. | |
| 6,451,407 B1 | 9/2002 | Nickell | |

OTHER PUBLICATIONS

"Untangling the Terminology of Static Dissapation," Plastics World, Mar. 1989, p. 46.

L. G. Britton, "Static Hazards Using Flexible Intermediate Bulk Containers for Powder Handling", Process Safety Progress, vol. 1, No. 4, Oct. 1993, pp. 240–250.

(Continued)

*Primary Examiner*—Bibhu Monhanty

(57) ABSTRACT

A system with reduced electrostatic discharge including woven fabric configured into a flexible container and having sufficient electrical resistivity to allow discharges of energy from the fabric of below about one-hundred nanocoulombs when the fabric is charged to more than about negative ten thousand volts. The flexible fabric container with a reduced potential for incendiary discharge may further include quasi-conductive fibers or a combination of quasi-conductive fibers and an antistatic coating. The quasi-conductive fibers further may be woven into the fabric. The present invention also discloses a method for reducing electrostatic discharge in ungrounded type flexible fabric container systems by providing a flexible fabric container made from woven fabric and adjusting the electric resistivity of the woven fabric to allow the flow of electricity through the fabric at a rate allowing discharges at below about one-hundred nanocoulombs when the fabric is charged at more than about negative ten kilovolts.

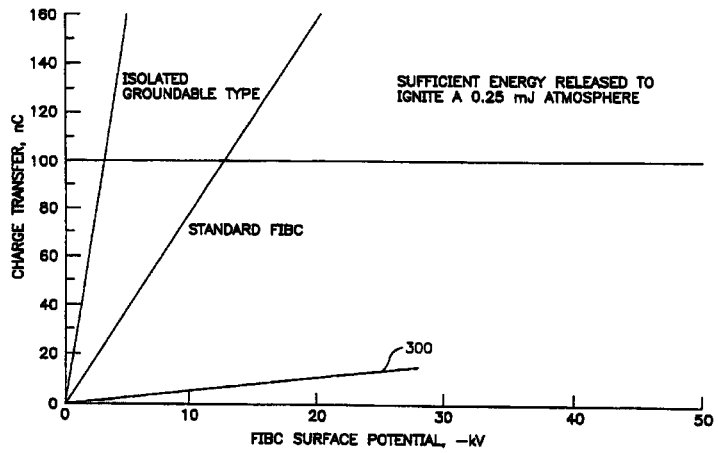

OTHER PUBLICATIONS

V. Ebadat et al., "Ungrounded Static Protective FIBCs," Inst. Phys. Conf. Ser. No. 143, Paper presented at 9th Int. Conf. on Electrostatics, Apr. 2–5, 1995, pp. 305–310.

"Anti Static Mechanisms Associated with FIBC Fabrics Containing Conductive Fibres," M.A. Nelson et al., Journal of Electrostatics, vol. 30 proceedings of the pages presented at the Seventh Intl. Conference on Electrostatics, May 11–13, 1992, Elsevier Science Publishers, B.V. (1993).

"The Electrostatic Spark Discharing Behaviour of Some Flexible, Intermediate Bulk Containers", Dr. N. Wilson, Sep. 28, 1989, IBC Technical Services, Ltd.

"Nega Stat by Barnet," Barnet webpage on Nega–Stat at http://www.barnet.com/html/nega_stat.html (cited under MPEP Section 2124).

"Static Electricity and FIBC's" Linq Industrial Fabrics, Inc. literature with product data sheets dated Dec. 1, 1992.

"Static Electricity and FIBCs," Exxon publication BBS–1191, and "Baxon Blue," Exxon publication BBP–1191–A, Oct. 1, 1991.

Nega–Stat the New Standard in Static Dissapative Fibers, Dupont, pp. 2–18, facsimile date of Feb. 28, 1994.

"Electrostatic Hazards in the Use of Flexible Intermediate Bulk Containers" V. Ebadat et al., Presented at the Hazards XI, Institution of Chemical Engineering Symposium, Manchester, United Kingdom (Apr. 1991). Hazards XI: New Directions in Process Safety, Institution of Chemical Engineers Symposium Series No. 124, 1991: pp. 105–117.

"A Brief History of Crohmiq," Linq Industrial Fabrics, Inc. web page at http://www.crohmiq.com/about/chrohist.html (cited under MPEP Section 2124).

"Static Protective FIBC Fabric is FCA Compliant" press release dated Jul. 1, 2004 at http://news.thomasnet.com/printready.html?prid=453424 (cited under MPEP Section 2124).

Patent Assignment Abstract of Title for U.S. Patent 5,202,185 (cited under MPEP Section 2124).

"The Effectiveness of Static Dissipative Fibers and Fabrics," DuPont NETA–STAT® Marketing Video, Copyright 1993 (submitted herein in CD–R format and transcript format).

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–10 is confirmed.

* * * * *

(12) EX PARTE REEXAMINATION CERTIFICATE (6760th)
United States Patent
Ebadat et al.

(10) Number: US 5,679,449 C2
(45) Certificate Issued: Apr. 7, 2009

(54) LOW DISCHARGE ANTI-INCENDIARY FLEXIBLE INTERMEDIATE BULK CONTAINER

(75) Inventors: Vahid Ebadat, Lawrenceville, NJ (US); George M. Milner, Summerville, SC (US); Robert J. Pappas, Mt. Pleasant, SC (US)

(73) Assignee: Texene LLC, Summerville, SC (US)

Reexamination Request:
No. 90/008,983, Jan. 7, 2008

Reexamination Certificate for:
Patent No.: 5,679,449
Issued: Oct. 21, 1997
Appl. No.: 08/457,441
Filed: Jun. 1, 1995

Reexamination Certificate C1 5,679,449 issued Dec. 25, 2007

Certificate of Correction issued Aug. 28, 2001.

Related U.S. Application Data

(63) Continuation-in-part of application No. PCT/US94/12097, filed on Oct. 21, 1994, now abandoned, and a continuation-in-part of application No. 08/252,660, filed on Jun. 1, 1994, now Pat. No. 5,478,154, and a continuation-in-part of application No. 08/139,113, filed on Oct. 21, 1993, now abandoned.

(51) Int. Cl.
| | | |
|---|---|---|
| B32B 23/10 | (2006.01) | |
| B32B 23/00 | (2006.01) | |
| B65D 88/16 | (2006.01) | |
| B65D 88/00 | (2006.01) | |
| D06N 3/04 | (2006.01) | |
| D06N 3/00 | (2006.01) | |
| D06M 17/00 | (2006.01) | |
| D06M 17/04 | (2006.01) | |
| D06M 15/227 | (2006.01) | |
| D06M 13/224 | (2006.01) | |
| D06M 13/00 | (2006.01) | |
| D06M 15/21 | (2006.01) | |
| D03D 15/00 | (2006.01) | |

(52) U.S. Cl. .................. 442/110; 383/113; 383/116; 383/117; 383/67; 383/105; 428/373; 428/374; 428/368; 428/397

(58) Field of Classification Search .................. None
See application file for complete search history.

(56) References Cited

U.S. PATENT DOCUMENTS

| | | |
|---|---|---|
| 3,803,453 A | 4/1974 | Hull |
| 3,963,803 A | 6/1976 | Tanaka et al. |
| 3,969,559 A | 7/1976 | Boe |
| 4,129,677 A | 12/1978 | Boe |
| 4,207,376 A | 6/1980 | Nagayasu et al. |
| 4,303,733 A | 12/1981 | Bulle et al. |
| 4,357,390 A | 11/1982 | Ozaki et al. |
| 4,604,320 A | 8/1986 | Okamoto et al. |
| 4,666,764 A | 5/1987 | Kobayashi et al. |
| 4,756,969 A | 7/1988 | Takeda |
| 4,807,299 A | 2/1989 | Nattrass et al. |
| 4,931,598 A | 6/1990 | Calhoun et al. |

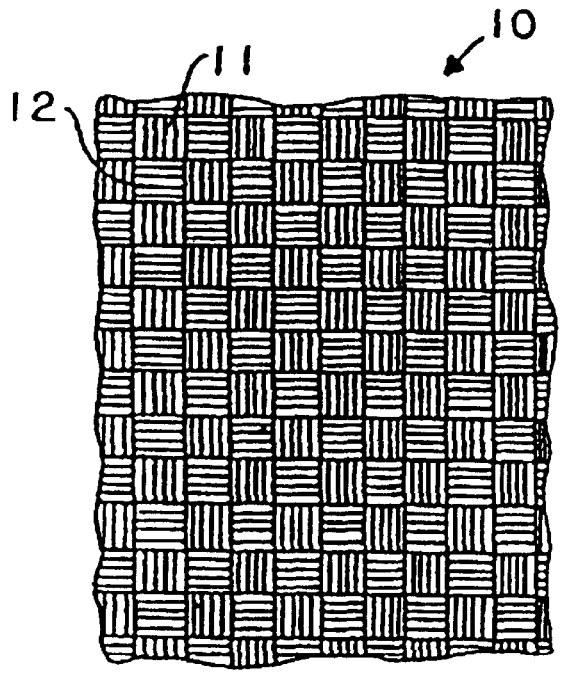

| | | |
|---|---|---|
| 4,944,604 A | 7/1990 | Myklebust et al. |
| 4,997,712 A | 3/1991 | Lin |
| 5,019,445 A | 5/1991 | Sternlieb |
| 5,071,699 A | 12/1991 | Pappas et al. |
| 5,092,683 A | 3/1992 | Wurr |
| 5,202,185 A | 4/1993 | Samuelson |
| 5,277,855 A | 1/1994 | Blackmon et al. |
| 5,518,812 A | 5/1996 | Mitchnick et al. |
| 6,503,959 B1 | 1/2003 | Nishiyama et al. |

OTHER PUBLICATIONS

Luttgens, "Static Electricity Hazards in the use of Flexible Intermediate Bulk Containers (FIBC's)," IEEE Transactions on Industry Applications, vol. 33, No. 2, Mar./Apr. 1997, pp. 444–446.*

"Nega–Stat the New Standard in Static Dissipative Fibers," Dupont, (pp. 2–18), dated Feb. 28, 1994.

"The Effectiveness of Static Dissipative Fibers and Fibrics," DuPont NEGA–STAT® Marketing Video, Copyright 1993 (submitted herein in CD–R format and transcript format).

"Static Electricity and FIBCs," Exxon publication BBS–1191–A and BAXON® Blue Exxon Publication BBP–1191–A, Oct. 1, 1991.

J.N. Chubb, The Control of Static Electricity, Electrostatics Summer School '5, University College of North Wales, Bangor, Sep. 1985.

Laurence G. Britton, "Static Hazards Using Flexible Intermediate Bulk Containers for Powder Handling," *Process Safety Progress* (vol. 12, No. 4), pp. 240–250, Oct. 1993.

Gunter Luttgens, Martin Glor, "Understanding and Controlling Static Electricity," Ehningen bel Boblingen: expert–Vert., 1989, ISBN 3–8169–0510–2.

Ian Davidson, "Selecting and using bulk bags—Part I," *Power and Bulk Engineering*, pp. 33–38, CSC Publishing, Aug. 1989.

British Standards Institution, "Code of practice for Control of undesirable static electricity. Part 1. General considerations," BS 5958 : Part 1 : 1991, Global Engineering Documents.

British Standards Institution, "Code of practice for Control of undesirable static electricity. Part 2. Recommendations for particular industrial situations," BS 5958 : Part 2: 1991, Global Engineering Documents.

P. Cartwright, Sampuran Singh, D.G.L. Thorpe, "Study of Electrostatic Hazards Associated with the Use of Intermediate Bulk Containers," IEEE, pp. 1384–1390, 1986.

Exxon Chemical, "Intermediate Bulk Container Fabrics: Baxon Blue,"Polymers Group, BBP–1191–A, Oct. 1991.

E. Wurr, "Electrostatic Charge Dissipation of FIBCs Permanent and Reliable," *Powder Handling & Processing*, vol. 4, No. 1, Mar. 1992.

G. Luttgens, "Dangers of Electrostatic Ignition When Using Flexible Bulk Containers," *Powder Handling & Processing*, vol. 4, No. 1, Mar. 1992.

M. Glor, "Discharges and hazards associated with the handling of powders," Inst. Phys. Conf. Ser. No. 85: Section 3, pp. 207–216, Paper presented at Electrostatics '87, Oxford, IOP Publishing Ltd. 1987.

Laurence G. Britton, "Static Hazards Using Flexible Intermediate Bulk Containers for Powder Handling," Central Research and Engineering Technology Department, Chemical Engineering Technology Section, Union Carbide corporation, 1993.

C. James Dahn, A. Kashani, B. Reyes, "Flexible Intermediate Bulk Container (FIBC) Potential Electrostatic Hazards," Safety Consulting Engineers, Inc., Schaumburg, IL, no date.

Reinhard E. Bruderer, "Use Bulk Bags," *Chemical Engineering Progress*, pp. 28–31, May 1993.

B. Maurer, M. Glor, G. Luttgens, L. Post, "Hazards associated with propagating brush discharges on flexible intermediate bulk containers, compounds and coated materials," Inst. Phys. Conf. Ser. No. 85: Section 3, pp. 217–222, Paper presented at Electrostatics '87, Oxford, IOP Publishing Ltd. 1987.

M. Glor, "Ignition of Gas/Air Mixtures by Discharges Between Electrostatically Charged Plastic Surfaces and Metallic Electrodes," *Journal of Electrostatics*, 10 (1981), pp. 327–332, Elsevier Scientific Publishing Company 1981.

Ma Nelson, Dr. RL Rogers, "Electrostatic problems with Flexible Intermediate Bulk Containers," Paper presented at IBC European Seminar on Electrostatic Hazards in Industry, Nov. 1991.

The Packaging Institute USA, "FIBC performance standards," *Powder and Bulk Engineering*, p. 32, May 1988.

Union Carbide Corporation Testing and Research Service, "Vacuum Aluminized Flexible Intermediate Bulk Bags Electrical and Barrier Properties," Job No. 85112501, Testing Service Performed for: B.A.G. Corporation, Nov. 25, 1985.

M. Glor, B. Maurer, R. Rogers, "Recent Developments in the Assessment of Electrostatic Hazards Associated with Powder Handling," *Loss Prevention and Safety Promotion in the Process Industries*, vol. 1, pp. 219–230, Elsevier Science B.V. 1995.

SR Beattie, "Antistatic Mechanisms Associated with FIBC Containing Conductive Threads," Zeneca Fine Chemicals Manufacturing Organisation, Manchester, U.K., no date.

Dr. P. Cartwright, "Electrostatic Hazards in the Use of Flexible Intermediate Bulk Containers (FIBC's )," Chilworth Technology, Beta House, Chilworth Research Centre, Southampton SO16 7NS, no date.

Vahid Ebadat, James C. Mulligan, Robert J. Pappas, Sampuran Singh, "Experimental Research on Static Protective Flexible Intermediate Bulk Containers," Prepared for presentation at the IBC Conference "Process Safety—The European Dimension," Nov. 16 & 17, 1994.

Linq Industrial Fabrics, "New Generation of Static Protective Fabrics for FIBC Packaging," no date.

Dr. Vahid Ebadat, "Towards a "Safe" FIBC," Chilworth Technology, Inc., Princeton Corporate Plaza, New Jersey, no date.

K. Ikezaki, K. Iritani, T. Nakamura, T. Hori, "Charge stability of TPX film electrets," *Journal of Electrostatics*, 35 (1995), pp. 41–46, Elsevier Science B.V.

Mark N. Horenstein, "Surface Charging Limit for a Woven Fabric on a Ground Plane,"*Journal of Electrostatics*, 35 (1995), pp. 31–40, Elsevier Science B.V.

Mark N. Horenstein, "Measuring Isolated Surface Charge with a Noncontacting Voltmeter," *Journal of Electrostatics*, 35 (1995), pp. 203–213, Elsevier Science B.V.

* cited by examiner

*Primary Examiner*—Alan Diamond

(57) ABSTRACT

A system with reduced electrostatic discharge including woven fabric configured into a flexible container and having sufficient electrical resistivity to allow discharges of energy from the fabric of below about one-hundred nanocoulombs when the fabric is charged to more than about negative ten thousand volts. The flexible fabric container with a reduced potential for incendiary discharge may further include quasi-conductive fibers or a combination of quasi-conductive fibers and an antistatic coating. The quasi-conductive fibers further may be woven into the fabric. The present invention also discloses a method for reducing electrostatic discharge in ungrounded type flexible fabric container systems by providing a flexible fabric container made from woven fabric and adjusting the electric resistivity of the woven fabric to allow the flow of electricity through the fabric at a rate allowing discharges at below about one-hundred nanocoulombs when the fabric is charged at more than about negative ten kilovolts.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–3 are determined to be patentable as amended.

Claims 4–10, dependent on an amended claim, are determined to be patentable.

1. An ungrounded flexible fabric container system with a reduced energy of electrostatic discharge *suitable* for use in a combustible environment *with a minimum ignition energy of 0.25 mJ*, comprising:

a woven fabric configured to form the flexible fabric container having side walls, a closed end and an open end;

*said woven fabric including a plurality of quasi-conductive fibers, said fibers having filaments that are sized and shaped to effect corona discharges at corona discharge points while having a resistance to avoid discharges at the ends and along the length of the filaments at a rate that would result in an incendiary type of discharge in the combustible environment of 0.25 mJ;* and said woven fabric having an electrical resistivity to allow the flow of electricity through the fabric at a rate to discharge of below about one-hundred nanocoulombs per individual discharge *whenever* the fabric *is* charged at greater than about negative ten thousand volts.

2. A system as in claim 1 wherein said woven fabric has an electrical resistivity to allow the flow of electricity through the fabric at a rate to discharge of between about four nanocoulombs to about fifteen nanocoulombs per individual discharge [with] *whenever* the fabric *is* charged at greater than about negative ten thousand volts.

3. A system as in claim 1 wherein said [fabric includes a plurality of] quasi-conductive fibers *are* positioned [preferably] about one-half to about four inches apart from one another [and having corona discharge points, said quasi-conductive fibers being composed of materials and being sized and shaped to effect corona discharge at said discharge points while having a resistance to avoid incendiary discharge at its ends or along its length at a rate that results in incendiary type discharges in the combustible environment of 0.25mJ].

\* \* \* \* \*